Jan. 9, 1962   C. BRAMMING   3,016,159
VACUUM BOTTLES WITH PLASTIC LINERS
Filed June 16, 1959
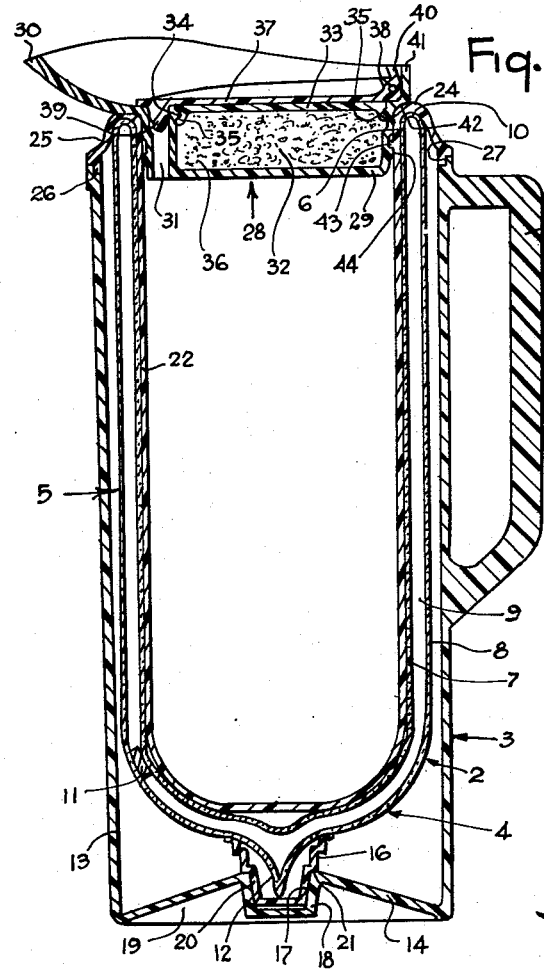
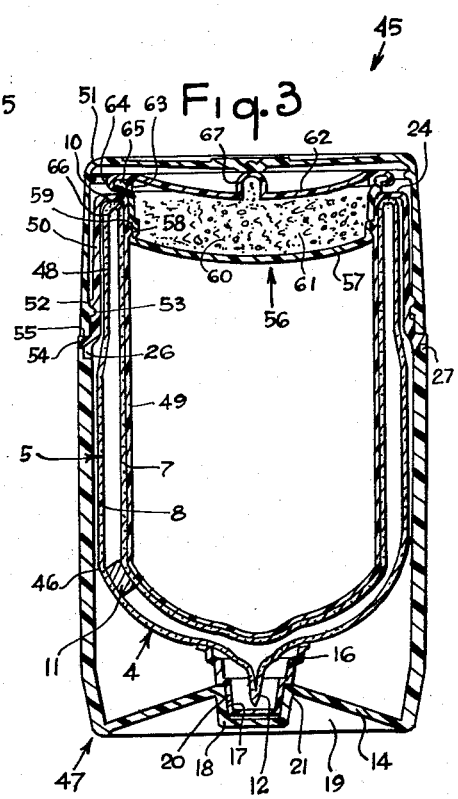
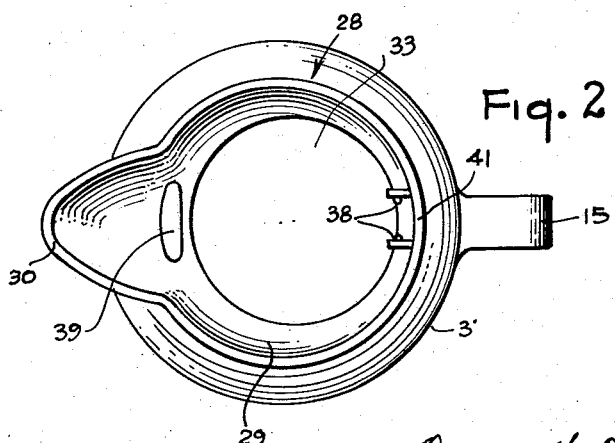
*INVENTOR.*
CARL BRAMMING
BY
Ooms, McDougall, Williams & Hersh
ATTORNEYS "# United States Patent Office 3,016,159
Patented Jan. 9, 1962

3,016,159
VACUUM BOTTLES WITH PLASTIC LINERS
Carl Bramming, Nashville, Tenn., assignor to Aladdin Industries, Incorporated, Nashville, Tenn., a corporation of Illinois
Filed June 16, 1959, Ser. No. 820,700
1 Claim. (Cl. 215—13)

This invention relates to vacuum bottles of the type having a vacuum insulated filler or receptacle which is enclosed within a protective jacket.

One object of the present invention is to provide a new and improved vacuum bottle in which the inner wall of the vacuum insulated receptacle is provided with a liner so as to protect the receptacle against abrasion and breakage.

A further object is to provide a new and improved vacuum bottle of the foregoing character, in which the liner is impervious to liquids and is preferably made of a plastic material which will withstand both high and low temperatures and may even be sterilized in boiling water or steam.

Another object is to provide a new and improved vacuum bottle in which the upper end of the liner is connected to the upper end of the jacket, so that the entire receptacle is encased and sealed within the joined liner and jacket.

A further object is to provide such a new and improved vacuum bottle in which the upper portion of the liner is adapted to receive a closure and is provided with threads or other locking elements for securing the closure in the liner.

Still another object is to provide a new and improved vacuum bottle which is extremely durable, easy to clean and sanitary, yet is easy to manufacture and low in cost.

Further objects and advantages of the present invention will appear from the following description, taken with the accompanying drawings, in which:

FIG. 1 is a central vertical section of a vacuum insulated pitcher or carafe, to be described as an illustrative embodiment of the present invention.

FIG. 2 is a top view of the carafe with a portion of the closure removed.

FIG. 3 is a central vertical section showing a wide mouth vacuum bottle constituting a modified embodiment of the present invention.

It will be seen that FIGS. 1 and 2 illustrate a specialized type of vacuum bottle in the form of a pitcher or carafe 1, comprising a vacuum insulated filler or receptacle 2, received within a protective jacket 3. The illustrated receptacle 2 has a closed bottom portion 4 and a generally cylindrical side portion 5. A wide mouth 6 is formed in the upper end of the side portion 5. It will be apparent that the mouth 6 corresponds in diameter to the side portion 5. Thus, there is no substantial necking down of the mouth 6.

In the usual manner, the vacuum insulated receptacle 2 is formed with inner and outer walls 7 and 8, with an evacuated space 9 therebetween. The upper ends of the inner and outer walls 7 and 8 are welded or otherwise joined together to form a top edge or rim 10. The walls 7 and 8 are preferably made of glass so that the vacuum between the walls will be effectively maintained. Pads 11 of insulating material may be provided between the lower portions of the walls 7 and 8 so that the inner wall 7 will be adequately supported against vibration and shock. The lower portion of the outer wall 8 is formed with a tubulation 12 which represents the remaining or sealed off portion of the tube employed in evacuating space 9. In this case, the tubulation 12 is centrally disposed on the bottom of the receptacle 2.

The protective jacket 3 is preferably made of a suitable resinous plastic material, such as polypropylene, but it may be made of metal or various other suitable materials. The illustrated jacket 3 comprises a generally cylindrical side wall 13 which is spaced outwardly a short distance from the side portion 5 of the filler 2. A bottom wall 14 is formed integrally with the side wall 13. Thus, the jacket 3 surrounds and protects the outside of the fragile filler 2. For convenience in pouring liquids from the filler 2, a handle 15 may be molded integrally with the side wall 13.

Means are provided in the lower portion of jacket 3 to support the filler 2. In this case, the fragile tubulation 12 is surrounded and protected by a generally cup-shaped tip protector 16 which may be made of plastics, metal or other suitable materials, and may be cemented to the bottom of the filler 2. The bottom wall 14 of the jacket 3 is formed with a socket or well 17 to receive and support the tip protector 16. It will be seen that the socket 17 is formed by a generally cup-shaped member 18 which is molded integrally with the bottom wall 14 at the center thereof. The cup-shaped member 18 projects downwardly from the bottom wall 14, but the bottom wall is upwardly domed or dished to form a downwardly facing recess 19, within which the member 18 is received. Thus, the bottom of the member 18 is raised slightly above the lower end of the jacket 3.

The tip protector 16 has a reduced lower end portion 20 which is received within the socket 17. A downwardly facing shoulder 21 is formed on the tip protector 16 at the upper end of the reduced portion 20. It will be seen that the shoulder 21 is engaged with the bottom wall 14 around the socket 17.

In accordance with the present invention, the vacuum insulated receptacle 2 is provided with a liner 22 which is closely received within the inside of the receptacle, so as to cover the entire inner wall 7. The liner 22 is made of a material which is impervious to liquids and resistant to both high and low temperatures. Thus, various suitable resinous plastic materials may be employed in the liner 22. A particularly advantageous material is polypropylene, which is not affected by any of the common food materials, such as milk, cream, butter, food acids, and the like. This material is odorless, tasteless and non-toxic. Polypropylene will not absorb water. Moreover, it will withstand a high temperature of at least 300 degrees Fahrenheit without softening. It will also withstand sub-zero temperatures, considerably colder than any temperature to which it would be subjected by frozen foods or beverages.

Polypropylene also has excellent mechanical properties. It is soft enough to be shock resistant and virtually unbreakable, yet hard enough to be strong and scuff resistant.

In this case, the liner 22 has an upper portion 24 which extends over the top edge or rim 10 of the filler 2. A skirt-like flange 25 extends downwardly and outwardly from the upper portion 24. At its lower edge, the flange 25 is joined to the upper edge of the jacket 3. In this case, the joint between the flange 25 and the jacket 3 is formed by a reduced lower portion 26 on the flange 25, adapted to be closely received within an internally enlarged portion 27 at the upper end of the side wall 13. The joint may be welded, cemented or otherwise sealed so as to be impervious to liquids. Thus, the joint may readily be spin-welded by rapidly rotating jacket 3 relative to the flange 25 for a few seconds. The friction at the joint creates enough heat to weld the members 26 and 27 together.

It will be apparent that the carafe 1 is readily assembled by inserting the filler 2 within the jacket 3, inserting the liner 22 into the filler 2, mating the joint elements 26 and 27, and spin-welding the joint elements as just described. The upper portion 24 of the liner 22 presses the filler 2 lightly in a downward direction so that the tip protector 16 will be held against the bottom wall 14. Because of its upwardly domed construction, the bottom wall 14 acts as a spring which resiliently supports the filler 2. The spring effect is particularly pronounced when the jacket 3 is made of a plastic material such as polypropylene. Thus, the filler 2 is effectively protected against breakage.

In this case, the carafe 1 is provided with a closure 28 which is removably received in the upper end of the liner 22. The illustrated closure 28 comprises a generally cup-shaped stopper member 29 which is formed with an integral pouring lip or spout 30 extending upwardly and outwardly from one side of the stopper member 29. The stopper member 29 is preferably molded from a suitable plastic material such as polypropylene. Adjacent the spout 30 is formed an opening 31 through the stopper 29 to carry liquid out of the vacuum insulated receptacle 2.

In the illustrated construction, a cavity 32 is formed in the cup-shaped stopper 29. The upper end of the cavity 32 is closed by a disk or plate 33 which may also be made of a suitable plastic material. The disk 33 may be arranged to snap into the upper end of the cavity 32. Thus, the edge of the disk 33 may be formed with a groove 34, adapted to receive an inwardly projecting ridge or flange 35, formed within the cavity 32. To increase the insulating value of the stopper 29, the cavity 32 may be filled with a granular or fibrous insulating material 36, such as ground cork, for example.

An automatic valve or gate 37 may be provided to close the opening 31, except when liquid is being poured through the opening. As shown, the gate 37 comprises a plate which is swingable about pivots 38 formed on one side of the stopper 29. A downwardly projecting plug or stud 39 is formed integrally with the plate 37 and is adapted to close the opening 31. When liquid is poured through the opening 31, the weight of the liquid pushes the plug 39 out of the opening 31 and swings the plate 37 away from the stopper 29. The outward swinging movement of the plate 37 is limited by an ear 40 which projects upwardly from the plate 37 adjacent the pivots 38. The ear 40 is adapted to engage a flange 41 which projects upwardly from the stopper 29.

In order that the stopper 29 may form a seal with the liner 22, the upper portion of the stopper is enlarged to form a downwardly facing shoulder 42 on the stopper 29, adapted to engage the upper portion 24 of the liner 22. Interengageable threads or other locking elements 43 and 44 may be formed on the liner 22 and the stopper 29 to secure the stopper in the upper end of the liner. Thus, the stopper may be screwed into and out of the upper end of the liner.

By making all of the plastic parts out of a suitable material, such as polypropylene, the entire carafe 1 may be sterilized in boiling water. When the carafe is to be sterilized, the closure is normally removed, and both the closure and the body of the carafe are sterilized.

The liner 22 prevents the vacuum insulated receptacle 2 from being scratched or broken by a spoon, fork or other implement which may be inserted into the receptacle to stir or remove the contents thereof. Before the liner was provided, it was found that the inner wall of the vacuum insulated receptacle was often scratched by such implements. Even a minor scratch weakens the inner wall to such an extent that it can no longer withstand the force of atmospheric pressure, which thereupon implodes or breaks the vacuum insulated receptacle. Such implosion of wide mouth bottles is quite common with conventional unlined fillers. Thus, the provision of the liner greatly increases the resistance of the filler to breakage.

FIG. 3 illustrates a modified vacuum bottle 45 which is quite similar in many respects to the vacuum bottle 1 of FIGS. 1 and 2. Thus, the vacuum bottle 45 comprises a filler 46 which is received within a jacket 47. The vacuum insulated filler or receptacle 46 is quite similar to the filler 2 of FIG. 1. Corresponding parts of the two fillers have been given the same reference characters in the drawings, so that the descriptive matter directed to the filler 2 may be applied to the filler 46. It will be seen that the filler 46 is somewhat shorter than the filler 2. Moreover, the outer wall 8 of the filler 46 has an upper portion 48 which is slightly reduced in diameter.

The protective jacket 47 is quite similar to the jacket 3 of FIG. 1. Corresponding parts of the two jackets are given the same reference characters so that the description directed to FIG. 1 may be applied to FIG. 3. The jacket 47 is somewhat shorter than the jacket 3 and is formed without the handle 15.

A liner 49 is closely received within the filler 46. The liner 49 is quite similar to the liner 22 of FIG. 1. Corresponding parts of the two liners are given the same reference characters. It will be seen that the depending skirt-like flange 25 of FIG. 1 is replaced by a somewhat longer flange 50 in FIG. 3. An inverted cup 51 is adapted to be received around the outside of the flange 50, so as to cover the top of the vacuum bottle. When removed from the vacuum bottle, the cup 51 may be used to hold the food or beverage poured out from the vacuum bottle. Interengageable threads or other locking elements 52 and 53 may be formed on the flange 50 and the cup 51, to secure the cup on the vacuum bottle. Near its lower end, the flange 50 has an enlarged portion 54 which defines an upwardly facing shoulder 55. The lower edge of the inverted cup 51 is engageable with the shoulder 55.

The closure 28 of FIG. 1 is replaced by a somewhat modified closure 56 in FIG. 3. It will be seen that the closure 56 comprises a stopper member 57 adapted to be received in the upper end of the liner 49. Interengageable threads 58 and 59 may be provided on the liner 49 and the stopper 57 to retain the stopper in the upper end of the liner 49.

A cavity 60 is formed within the cup-shaped stopper 57. The cavity 60 may be filled with ground cork or other granular or fibrous insulating material 61. The upper end of the stopper 57 is closed by a disk or cover member 62. In this case, the cover 62 is secured to the stopper 57 by providing inner and outer depending flanges 63 and 64 on the outer edge portion of the cover. The flanges 63 and 64 are adapted to embrace an enlarged bead or flange 65 on the upper edge of the stopper 57. It will be seen that the flange 64 is L-shaped and is adapted to be hooked under the bead 65. The cover 62 is preferably made of a suitable plastic material which is sufficiently flexible and resilient to provide for easy assembly of the flanges 63 and 64 around the bead 65. Thus, for example, the cover 62 may be made of polyethylene or polypropylene. The same materials may be employed in the stopper 57.

Near its upper end, the stopper 57 has a downwardly facing annular shoulder 66 which is adapted to seat against the upper end of the liner 49. To assist in the retention of the closure 56, the cover 62 may be formed with an upwardly projecting knob 67, adapted to be engaged by the under side of the cup 51.

In the vacuum bottle 47, the liner 49 protects the inner wall 7 of the filler 46 from being scratched or otherwise damaged by a spoon or other implement which may be inserted into the vacuum bottle. Thus, the vacuum bottle has great resistance to breakage. The joinder of the jacket 47 and the liner 49 encases the entire vacuum insulated receptacle 46 within a shell which is impervious to liquids. Thus, the vacuum bottle may be immersed in water for thorough cleaning. Moreover, in the unlikely event that the vacuum insulated receptacle 46 should be broken by some accident, it is impossible for the food or beverage contained in the vacuum bottle to escape. In addition, it is not possible for broken glass to get into the food or beverage.

The vacuum bottles of the present invention can be readily sterilized in boiling water or steam, without causing any damage. Thus, these vacuum bottles will find many applications, particularly in hospitals or the like, where it is desirable or necessary to sterilize vacuum bottles.

Various other modifications, alternative constructions and equivalents may be employed, without departing from the true spirit and scope of the invention, as exemplified in the foregoing description and defined in the following claim.

I claim:

In a vacuum bottle, the combination comprising a vacuum insulated receptacle having inner and outer walls with an evacuated space therebetween, a protective jacket received around the outside of said receptacle, a liner closely received within the inside of said receptacle and covering the entire inner surface of said inner wall, means extending over the upper edge of said receptacle and joining the upper end portions of said liner and said jacket, a closure removably received within the upper end of said liner, said liner and said closure having interengageable elements for securing said closure in said liner, a pouring spout on said closure, an opening through said closure for pouring liquid therethrough, and a movable valve member on said closure for opening and closing said opening.

References Cited in the file of this patent

UNITED STATES PATENTS

| | | |
|---|---|---|
| 1,672,904 | Randall | June 12, 1928 |
| 1,760,378 | Siegheim | May 27, 1930 |
| 2,573,378 | Zurlinden | Oct. 30, 1951 |

FOREIGN PATENTS

| | | |
|---|---|---|
| 682,122 | France | May 23, 1930 |
| 573,056 | Germany | Mar. 25, 1933 |